Patented Nov. 29, 1938

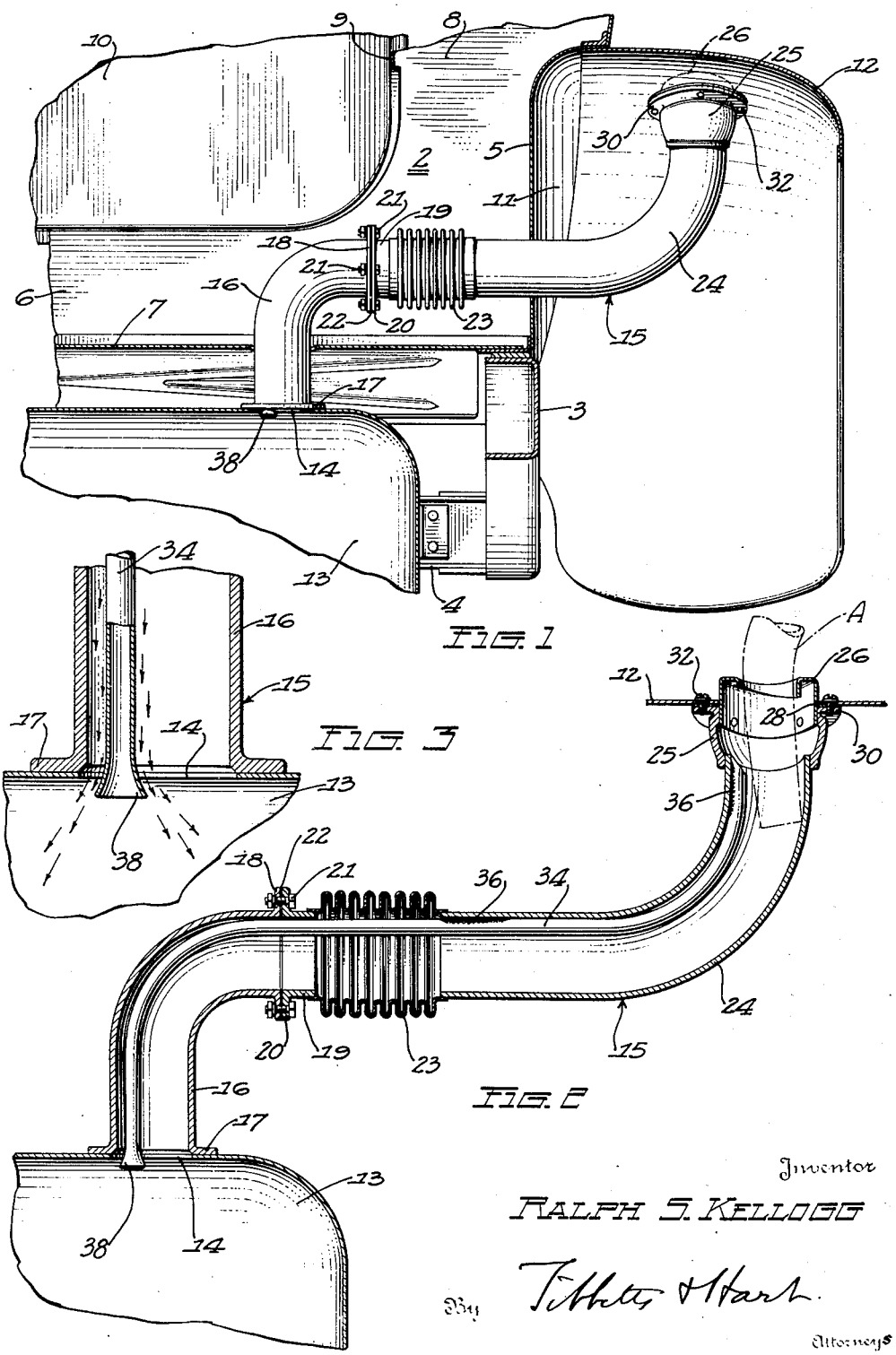

2,138,104

UNITED STATES PATENT OFFICE 2,138,104

MOTOR VEHICLE

Ralph S. Kellogg, Royal Oak, Mich., assignor to Packard Motor Car Company, Detroit, Mich., a corporation of Michigan Application February 4, 1935, Serial No. 4,753

2 Claims. (Cl. 220—86)

This invention relates to motor vehicles and more particularly to means for venting the air from the liquid fuel tank.

The liquid fuel tanks of motor vehicles are ordinarily each provided with a filler pipe through which the liquid fuel is introduced and with an air vent tube secured within the filler pipe to allow the air to be discharged from the tank as the fuel flows thereinto. The air vent tube extends from the inlet end of the filler pipe to or slightly beyond the end of said tube attached to the tank. In certain constructions during a filling operation, part of the inflowing fuel is carried into the lower end of the air vent tube by the outflowing air thereby clogging this tube and retarding the flow of the fuel through the filler pipe.

One object of the present invention is to provide a construction for motor vehicles which will prevent, during the introduction of fuel into the fuel tank, the inflowing fuel from being carried into the lower end of the air vent tube.

Another object of the invention is to produce for motor vehicles a construction which will direct the fuel flowing into the tank adjacent the inlet end of the air vent tube to prevent the same from entering said end of the tube.

With the above and other objects in view, the invention consists in a construction embodying the novel and improved features hereinafter described and particularly pointed out in the claims the advantages of which will be readily understood by those skilled in the art.

The invention will be clearly understood from the accompanying drawing illustrating the invention in its preferred form and the following detailed description of the construction therein shown.

In the drawing, Fig. 1 is a view in vertical section of a portion of a motor vehicle looking toward the rear of the vehicle and illustrating a construction embodying the invention applied thereto.

Fig. 2 is a detail view in vertical section illustrating a portion of the fuel tank and the filler tube shown in Fig. 1 with the nozzle of a filler hose inserted in the upper end of the filler tube and Fig. 3 is a detail view in vertical section illustrating the lower portions of the filler pipe and air vent tube and the adjacent portion of the fuel tank and indicating the manner in which the inflowing fuel is deflected as it reaches the lower end of the air vent tube.

The invention is illustrated in this application as applied to a motor vehicle indicated as a whole at 2 and comprising side frame members one of which is indicated at 3, cross frame members one of which is indicated at 4, side body panels, one of which is indicated at 5, a rear compartment 6, having a bottom 7, a rear wall 8 formed with an opening 9 and a door 10 for closing said opening. The side panels 5 are each recessed as at 11 to form a wheel housing and a rear fender 12 is secured to each side panel within this recess.

The vehicle is provided with a liquid fuel tank 13 supported between the side frame members. The tank is formed with a filling opening 14 and a filler pipe indicated as a whole at 15 is secured to the tank about said opening. The filler pipe comprises a section 16 having an elbow formation the downwardly extending arm of which is provided with a flange 17 by which said section is secured to the tank. The horizontally extending arm of said section is provided with a flange 18 and a short pipe section 19 provided with a flange 20 is secured to the section 16 by means of bolts 21 passing through said flanges, a gasket 22 being interposed between the flanges to form a tight joint. The filler pipe also comprises a flexible section 23 having a bellows formation and secured at one end to the section 19. To the other end of the flexible section 23 is secured the horizontal arm of a section 24 also having an elbow formation and provided with a tubular terminal 25 secured to the upper end of the vertically extending arm thereof. Within the terminal 25 is attached an annular member 26 projecting from said terminal and engaging in an opening 28 in the fender. The terminal 25 is formed with a flange 30 arranged to engage the fender about the opening 28 and the upper end of the filler tube is secured to the fender by screws 32.

As shown in Fig. 1, the filler pipe extends from the fender 12 downwardly and then laterally through an opening in the side panel 5 into the compartment 6 and from said compartment extends downwardly through an opening in the bottom wall 7 thereof to the fuel tank. The relative positions of the fuel tank and the fender 12 vary to some degree in different vehicles and the flexible section 23 of the filler pipe enables the pipe to be bent to compensate for such variations in the positions of said parts.

It will be observed, that, in the above construction, the filler tube is provided with a substantially vertical inlet end portion, with a substantially vertical portion adjacent the tank and with a substantially horizontal portion connecting said two vertical portions.

In order to vent the air as the fuel is introduced into the tank through the filler pipe 15, an air vent tube 34 is secured within the filler pipe. In the construction shown, this tube extends longitudinally of the filler pipe from a point adjacent the inlet end of said pipe to a point adjacent and preferably slightly beyond the discharge end of said pipe and is preferably bent to correspond with the bends in the filler pipe. That is, the tube is bent to provide a substantially vertical portion at the inlet end portion of the filler tube, a substantially vertical portion adjacent the tank and a substantially horizontal portion connecting said vertical portions. The vent tube is located in the filler pipe in substantially the position shown in the drawing so that it lies in contact with or close to the left hand side wall of the vertically extending upper portion of the filler pipe, the upper wall of the horizontally extending portion of the pipe and the left hand side wall of the vertically extending portion of the pipe adjacent the tank. The vent-tube is secured to the section 24 of the filler pipe at 36 preferably by soldering. As shown clearly in Fig. 2, the lower end portion of the air vent tube extends slightly beyond the lower end of the filler pipe, the vent tube projecting a short distance through the opening 14 into the fuel tank.

In filling the fuel tank the nozzle of the filler hose shown in dot and dash lines and indicated at A in Fig. 2 is inserted in the upper end of the filler pipe as shown in this figure, the lower end of the nozzle being located at one side of the air vent tube 34 and projecting down below the upper end of said tube. In order to prevent the fuel passing downwardly from the filler pipe into the fuel tank from being carried into the lower end of the air vent tube, means is provided for directing or deflecting said fuel adjacent the lower end of the tube. In the construction illustrated in this application the lower end portion of the tube is flared as indicated at 38 to secure this result. The inflowing fuel, as it rushes downwardly through the vertical portion of the filler pipe adjacent the tank, strikes the outer surface of the flared end of the tube and is deflected outwardly away from the axis of the tube as indicated by the arrows in Fig. 3. It is believed that this directing or deflection of the inflowing fuel, by spreading the stream, breaks the continuity of the same about the axis of the pipe so that openings are formed through which the air may pass. In any event it is found in actual practice that with this construction the air vent tube is unobstructed by fuel during the filling of the tank so that the air from the tank may pass out freely through said tube.

It is to be understood that the invention is not limited to the particular construction of the illustrated embodiment of the invention but that the invention may be embodied in other forms within the scope of the claims.

Having explained the nature and object of the invention and having specifically described a construction embodying the invention in its preferred form what is claimed is:

1. A construction for motor vehicles comprising a liquid fuel tank, a filler pipe for said tank having a vertically extending portion attached to the tank, and an air outlet tube mounted within said filler pipe and having its inlet end extending into said tank unrestrictedly below said filler pipe, the inlet end of said air outlet tube being flared for deflecting the inflowing fuel directly into the tank during a filling operation to exclude the same from a space of substantial volume immediately below said inlet end of the tube.

2. A construction for motor vehicles comprising a liquid fuel tank, a filler pipe for said tank, and a continuous air outlet tube fixed in said pipe, the outlet end of said tube being entirely open and extending to a point adjacent the inlet end of the filler pipe and the inlet end of said tube being flared and extending unrestrictedly into the tank below the pipe for creating a comparatively quiet air space of substantial volume immediately below said inlet end of said tube to facilitate fuel precipitation in said space.

RALPH S. KELLOGG.